(12) United States Patent
Gebhart et al.

(10) Patent No.: US 11,601,762 B2
(45) Date of Patent: Mar. 7, 2023

(54) SOUND TRANSDUCER AND METHOD FOR OPERATING THE SOUND TRANSDUCER

(71) Applicant: TDK Electronics AG, Munich (DE)

(72) Inventors: Michael Gebhart, Linz (AT); Peter Lukan, Deutschlandsberg (AT); Michael Krenn, Dobl-Zwaring (AT)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 17/286,383

(22) PCT Filed: Oct. 22, 2019

(86) PCT No.: PCT/EP2019/078728
§ 371 (c)(1),
(2) Date: Apr. 16, 2021

(87) PCT Pub. No.: WO2020/083910
PCT Pub. Date: Apr. 30, 2020

(65) Prior Publication Data
US 2021/0352413 A1   Nov. 11, 2021

(30) Foreign Application Priority Data
Oct. 23, 2018  (DE) .................. 10 2018 126 387.2

(51) Int. Cl.
*H04R 17/00*  (2006.01)
*H04R 17/10*  (2006.01)

(52) U.S. Cl.
CPC .................................. *H04R 17/10* (2013.01)

(58) Field of Classification Search
CPC ... H04R 7/16; H04R 7/18; H04R 7/20; H04R 7/22; H04R 7/24; H04R 7/26; H04R 17/00; H04R 17/005; H04R 2400/01
See application file for complete search history.

(56) References Cited

U.S. PATENT DOCUMENTS

| | | | | |
|---|---|---|---|---|
| 1,952,167 | A | * | 3/1934 | Hasbrouck ............... H04R 7/26 181/158 |
| 4,163,168 | A | * | 7/1979 | Ishikawa .................. G05D 3/00 250/442.11 |
| 4,379,951 | A | * | 4/1983 | Gabr ....................... H04R 7/18 181/161 |
| 4,651,310 | A | | 3/1987 | Kaneko et al. |
| 5,772,575 | A | * | 6/1998 | Lesinski .................. H04R 1/46 600/25 |

(Continued)

FOREIGN PATENT DOCUMENTS

| CN | 1264104 A | 8/2000 |
|---|---|---|
| CN | 104756521 A | 7/2015 |

(Continued)

*Primary Examiner* — Ryan Robinson
(74) *Attorney, Agent, or Firm* — Slater Matsil, LLP

(57) ABSTRACT

A sound transducer and a method for operating a sound transducer are disclosed. In an embodiment a sound transducer includes a first piezoelectric element having first external electrodes configured to generate an acoustic signal from an electrical signal or vice versa, and at least one second external electrode, wherein the second external electrode is separately controllable from the first external electrodes in order to set electro-acoustic properties of the sound transducer.

22 Claims, 4 Drawing Sheets

(56) References Cited

U.S. PATENT DOCUMENTS

| | | |
|---|---|---|
| 5,825,117 A | 10/1998 | Ossmann et al. |
| 5,867,450 A * | 2/1999 | Rogers .................. H04R 17/10 367/176 |
| 6,445,108 B1 | 9/2002 | Takeshima et al. |
| 6,882,086 B2 * | 4/2005 | Kornbluh ......... B60G 17/01941 310/330 |
| 7,289,638 B2 * | 10/2007 | Pavlovic ............. H04R 19/016 381/174 |
| 7,607,352 B2 | 10/2009 | Endou |
| 7,940,953 B2 * | 5/2011 | Regl ...................... H04R 13/00 381/399 |
| 7,986,198 B2 | 7/2011 | Nakatsuka et al. |
| 8,237,332 B2 * | 8/2012 | Kim ....................... H04R 17/00 310/334 |
| 8,503,693 B2 * | 8/2013 | Yu .......................... H04R 3/005 381/174 |
| 8,760,971 B2 | 6/2014 | Karl |
| 8,854,923 B1 * | 10/2014 | Eyster .................... H04R 17/10 310/317 |
| 9,035,532 B2 * | 5/2015 | Chowdhury .......... B06B 1/0292 367/181 |
| 9,055,373 B2 | 6/2015 | Kijima et al. |
| 9,660,170 B2 | 5/2017 | Hajati |
| 9,693,149 B2 * | 6/2017 | Yoo ........................ H04R 17/02 |
| 10,003,008 B2 * | 6/2018 | Fanget ................ H01L 41/0825 |
| 11,289,065 B2 * | 3/2022 | Mohare .................. G10K 15/02 |
| 2003/0127944 A1 | 7/2003 | Clark et al. |
| 2016/0303360 A1 | 10/2016 | Mulvihill et al. |
| 2017/0105065 A1 * | 4/2017 | Pinkerton ............ H04R 1/2834 |
| 2017/0170383 A1 | 6/2017 | Sammoura et al. |
| 2018/0320434 A1 * | 11/2018 | Carme ............. G10K 11/17875 |
| 2020/0322730 A1 * | 10/2020 | Kamiya ................ G01S 15/931 |

FOREIGN PATENT DOCUMENTS

| | | |
|---|---|---|
| DE | 3587146 T2 | 8/1993 |
| DE | 102009027221 A1 | 12/2010 |
| EP | 0875739 A1 | 11/1998 |
| EP | 3095530 A1 | 11/2016 |
| JP | H02199994 A | 8/1990 |
| JP | H0379199 A | 4/1991 |
| JP | H1023598 A | 1/1998 |
| JP | H10243498 A | 9/1998 |
| JP | 2003061194 A | 2/2003 |
| JP | 2007183185 A | 7/2007 |
| JP | 2010232971 A | 10/2010 |
| JP | 2012134597 A | 7/2012 |
| JP | 2014066819 A | 4/2014 |
| WO | 2008016075 A1 | 2/2008 |
| WO | 2011141255 A2 | 11/2011 |
| WO | WO-2016107975 A1 * | 7/2016 |

* cited by examiner

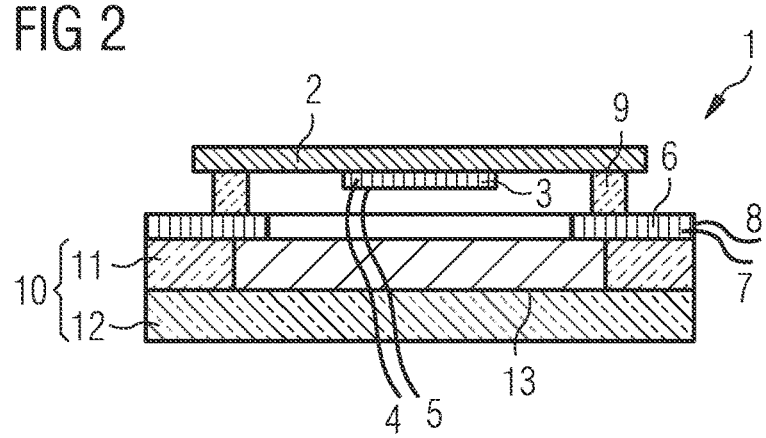
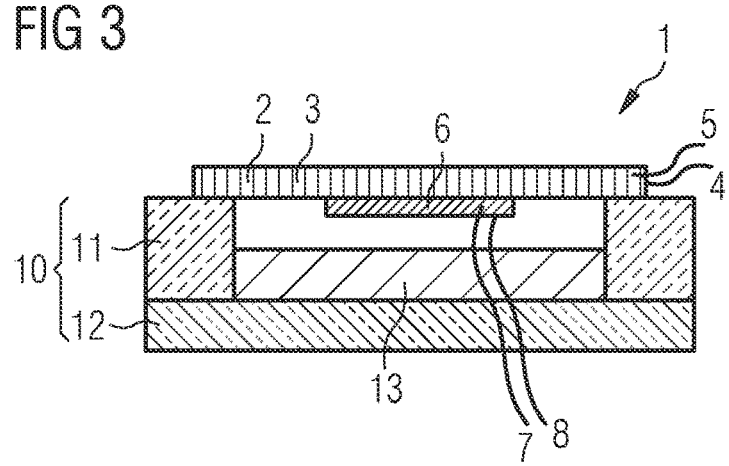
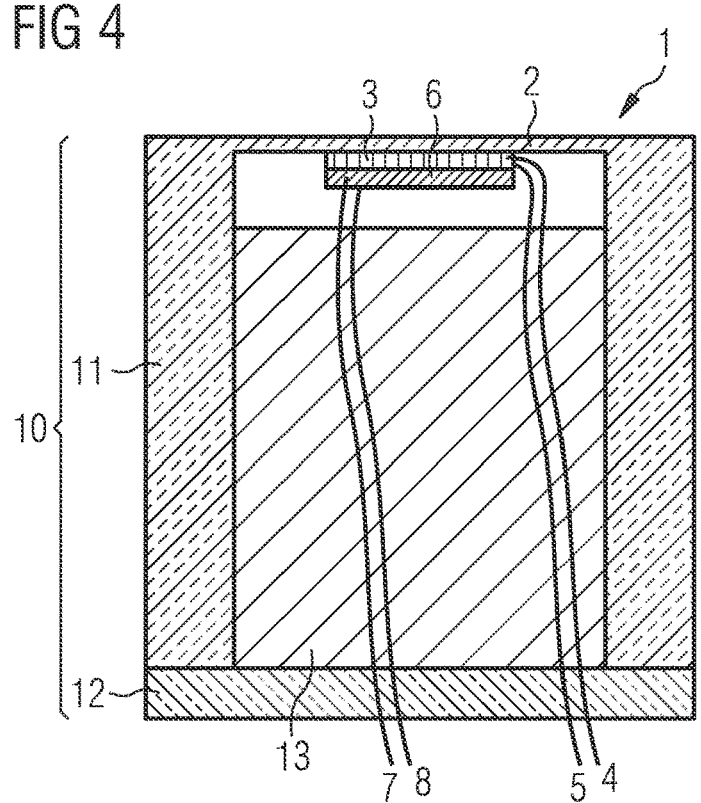

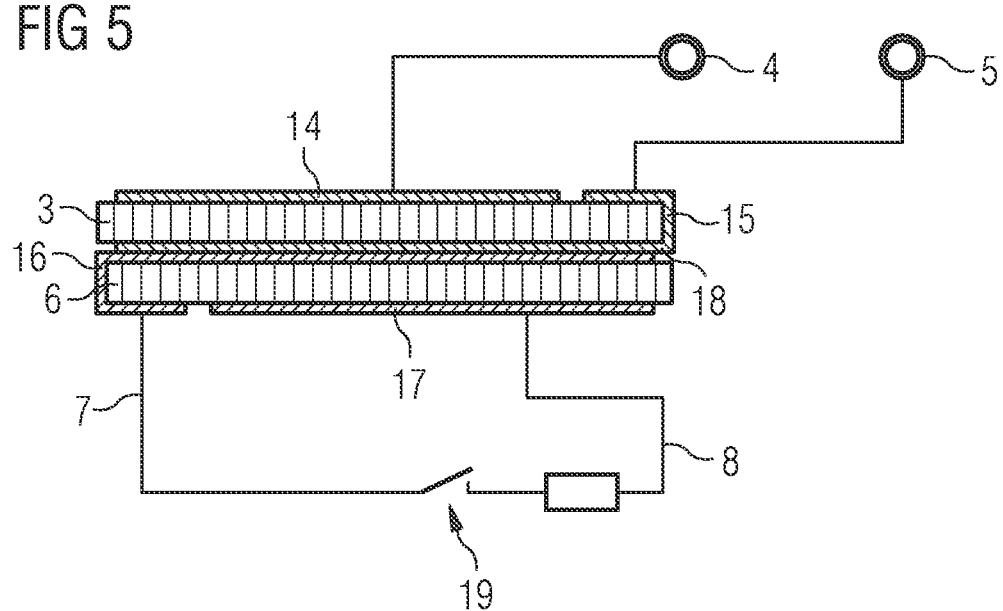
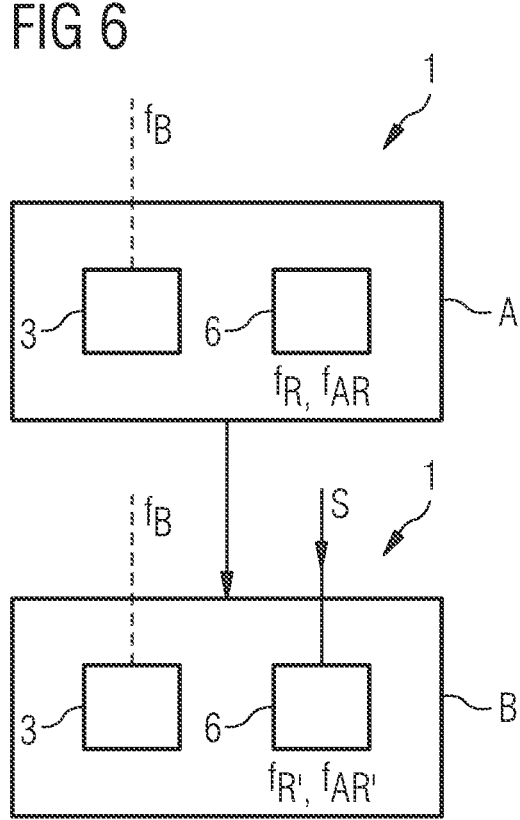

SOUND TRANSDUCER AND METHOD FOR OPERATING THE SOUND TRANSDUCER

This patent application is a national phase filing under section 371 of PCT/EP2019/078728, filed Oct. 22, 2019, which claims the priority of German patent application 102018126387.2, filed Oct. 23, 2018, each of which is incorporated herein by reference in its entirety.

TECHNICAL FIELD

The present invention relates to a sound transducer.

BACKGROUND

Such a component is designed, for example, to generate an acoustic signal from an electrical signal and/or vice versa. It may be, in particular, an ultrasonic transducer in which the acoustic signal has a frequency above the human hearing range. Such sound transducers are nowadays used for many measurement tasks, in particular for measuring distance. One known application example is the parking aid in automobiles, which is nowadays mainly performed by means of transit-time measurement using ultrasonic transducers in the rear fender. The typical frequency range of such applications in air extends approximately from 30 kHz to 100 kHz.

A sound transducer is a resonant component which is usually operated at its lowest resonant frequency. During the transit-time distance measurement which is usually used, the sound transducer emits a short acoustic burst at its operating frequency, for example under the electrical control of an ASIC in a circuit. The acoustic signal is reflected, at an object, back to the sound transducer which now receives the reflected acoustic signal, generates an electrical reception signal therefrom and supplies the latter to the evaluation unit, for example the ASIC, in order to evaluate the transit time.

SUMMARY

Embodiments provide an improved sound transducer and a method for operating such a sound transducer.

According to a first aspect, a sound transducer has a first piezoelectric element. The first piezoelectric element is designed to convert an electrical signal into a deformation or vice versa. The first piezoelectric element has first external electrodes. In particular, the first external electrodes can be controlled at the operating frequency of the sound transducer, in which case the first piezoelectric element is deformed. The piezoelectric element may be coupled to a diaphragm or may itself be in the form of a diaphragm. The deformation of the first piezoelectric element may cause a diaphragm vibration, thus generating an acoustic signal. The acoustic signal is reflected back, for example, and results in the deformation of the first piezoelectric element, thus generating an electrical reception signal. The operating frequency, that is to say the frequency of the voltage applied to the first piezoelectric element, usually corresponds to the acoustic resonant frequency of the sound transducer.

In one embodiment, the sound transducer has a diaphragm, to which the first piezoelectric element is connected in such a manner that it causes the diaphragm to vibrate when electrically controlled in a suitable manner. This generates an acoustic signal. The diaphragm is mounted, in particular, in a vibratable manner, for example is permanently mounted in the edge region and is movable in a central region. The first piezoelectric element is fastened to an underside of the diaphragm, for example. The first piezoelectric element is arranged, in particular fastened, only on the diaphragm, but not on the carrier body, for example. In particular, the first piezoelectric element has a shorter lateral extent than the diaphragm.

The advantage of separating the vibratable diaphragm and the piezoelectric element is that the diaphragm can be manufactured in a variable manner in terms of its material and structure and the diaphragm can be controlled independently of the environment. For example, the diaphragm may be formed in one part with a carrier body. The piezoelectric element can then be subsequently fastened to the diaphragm.

In a further embodiment, the first piezoelectric element itself is in the form of a diaphragm. The piezoelectric element is mounted, in particular, in a vibratable manner, for example is permanently mounted in the edge region and is vertically movable in a central region.

There may also be a combination of the two embodiments, with the result that the piezoelectric element is mounted in a vibratable manner and is additionally covered by a diaphragm.

In addition to the first external electrodes, the sound transducer has at least one second external electrode. The second external electrode is arranged, for example, on a second piezoelectric element of the sound transducer. It is also possible to arrange the second external electrode on the first piezoelectric element. The at least one second external electrode is used to set electro-acoustic properties of the sound transducer in a specific manner. For example, the second external electrode is used to set the resonant frequency, anti-resonant frequency and/or Q factor of the sound transducer. The second external electrode can be controlled separately from the first external electrodes.

For example, a second piezoelectric element is connected to a separate, second controller. The second controller can be used to apply a different electrical signal or a different termination to the second piezoelectric element than to the first piezoelectric element. For example, two second external electrodes are present separately from the first external electrodes. Only one additional second external electrode may also be present.

The second piezoelectric element forms, for example with the first piezoelectric element, a stacked arrangement. For example, the second piezoelectric element is arranged on that side of the first piezoelectric element which points into the interior of the ultrasonic transducer. In the case of a separate diaphragm, the diaphragm is arranged on a first side of the first piezoelectric element and the second piezoelectric element is arranged on an opposite second side of the first piezoelectric element, for example.

The second piezoelectric element may be in the form of a separate body or may be integrally formed with the first piezoelectric element. For example, in the case of an integral formation, the first piezoelectric element has first external electrodes for generating an acoustic signal from an electrical signal or vice versa and also has at least one second external electrode for setting the electro-acoustic properties. The regions assigned to the external electrodes can be polarized here during the poling of the sound transducer by virtue of different positioning of the external electrodes. During operation, the regions are used to generate the electrical or acoustic signal or to set the electro-acoustic properties. All of the properties described here for a sound transducer having a first and a second piezoelectric element also apply to a sound transducer in which the second piezoelectric element and the first piezoelectric element are integrally formed.

For example, the first external electrodes are designed to be controlled at an operating frequency which corresponds to the frequency of a generated acoustic signal. The control of the second external electrode is selected depending on the desired electro-acoustic properties.

The second external electrode is designed, for example, to produce a piezoelectric deformation and to thereby exert a tensile or compressive force on the diaphragm. In particular, the first or second piezoelectric element can radially expand or contract when a voltage is applied. For example, the second piezoelectric element is coupled to the vibratable diaphragm in such a manner that the deformation is transferred to the diaphragm. As a result, the rigidity of the diaphragm and therefore the resonant frequency, anti-resonant frequency and/or Q factor of the diaphragm can be changed.

In one embodiment, the second piezoelectric element is connected only to a section of the diaphragm, for example to an edge region of the diaphragm. This may be a supporting region of the diaphragm. It is also possible to establish the connection via a coupling element which transfers the deformation of the second piezoelectric element to the diaphragm. The second piezoelectric element can also be connected to the diaphragm directly, for example by means of adhesive bonding.

In a further embodiment, the second piezoelectric element is directly fastened to the diaphragm, for example to an underside of the diaphragm. The second piezoelectric element can be fastened to the diaphragm over the entire surface area, for example. If the diaphragm is formed by the first piezoelectric element, the second piezoelectric element is therefore fastened to the first piezoelectric element.

The second piezoelectric element is in the form of a small plate, for example. The second piezoelectric element can also be integrated in a carrier body of the sound transducer or can form said carrier body. For example, the second piezoelectric element is in the form of a hollow cylinder. In a further embodiment, the first piezoelectric element can be alternatively or additionally integrated in a carrier body.

The electro-acoustic properties of the sound transducer can be adapted in a specific manner by electrically controlling the second piezoelectric element. For example, a type of electrical control is determined during the production of the sound transducer or the type of control is dynamically adapted during operation.

In order to set the electro-acoustic properties, the second piezoelectric element is terminated in a low-resistance manner, is terminated in a high-resistance manner, has an electrical DC voltage applied to it or has an electrical AC voltage applied to it, for example. An electrical AC voltage is applied to the first piezoelectric element and an electrical AC voltage of a shifted phase angle is applied to the second piezoelectric element, for example.

Changes in the properties of the sound transducer on account of environmental conditions, for example the operating temperature, or on account of the service life, for example ageing of adhesive bonding points or of damping material, can be compensated for by means of the second piezoelectric element, for example. This makes it possible to achieve largely constant measurement results. In addition, manufacturing tolerances can also be compensated for by specifically controlling the second piezoelectric element. For example, the resonant frequency is shifted to the value of the original resonant frequency or toward a desired resonant frequency by means of the type of control. The control of the second piezoelectric element, which is needed for the desired shift, is determined in a calibration method, for example.

In addition, the second piezoelectric element makes it possible to optimize the sound transducer for particular operating modes. For example, the sound transducer can be optimized for operation at long distances by controlling the second piezoelectric element. In this case, the control is selected, for example, in such a manner that the sound transducer has a high Q factor, a long time constant and/or a high sound pressure amplitude. The sound transducer can be optimized for operation at short distances by controlling the second piezoelectric element in a changed manner. In this case, the control is selected, for example, in such a manner that the sound transducer has a low Q factor, a shorter time constant and/or a low sound pressure amplitude. This makes it possible to shorten the required delay time between the transmitting and receiving modes of the sound transducer. The type of control can be permanently defined or can be dynamically changed during operation, for example.

In addition, it is possible to change the properties of the sound transducer, while the signal is being emitted and received, by changing the control of the second piezoelectric element. For example, the resonant frequency and/or anti-resonant frequency can be adapted on the basis of the transmitting and receiving modes.

It is also possible to provide the acoustic signal with an identifier by specifically controlling the second piezoelectric element. In particular, a plurality of structurally identical sound transducers can be used in the same spatial region and the acoustic signals can be distinguished from one another by means of different identifiers. For example, the resonant frequencies of sound transducers may differ in terms of the type of control, with the result that sound transducers can be operated at different operating frequencies. An identifier may also be generated by means of frequency modulation of the acoustic signals.

A further aspect specifies a method for operating a sound transducer. This is, in particular, the sound transducer described above. The sound transducer may also be part of an arrangement of a plurality of sound transducers. In the method, the second external electrode is controlled in such a manner that the electro-acoustic properties of the sound transducer are set in a specific manner. In particular, the resonant frequency, anti-resonant frequency and/or Q factor of the sound transducer can be set by means of the control.

This makes it possible, for example, to compensate for environment-related or ageing-related shifts in the resonant frequency of the sound transducer.

For example, the resonant frequency which is now present corresponds to a permanently set operating frequency of the sound transducer. If the first external electrodes are controlled at the same time, the operating frequency is therefore now at the resonant frequency of the sound transducer.

In a further embodiment, the second external electrode is controlled in such a manner that the anti-resonant frequency is shifted to a desired value. For example, after an acoustic signal has been emitted, the anti-resonant frequency can be shifted toward the value of the resonant frequency present during emission. This makes it possible to optimize the reception of a signal which has been reflected back.

The operating variants described above can also be combined with one another.

According to a further aspect, an arrangement has a plurality of the sound transducers described above. The arrangement may be in the form of a parking aid for motor vehicles, in particular. In this case, the sound transducers may each have the same design. The second external electrodes of the sound transducers can be controlled differently from one another.

In this manner, the electro-acoustic properties of the sound transducers may be different depending on the selected control of the second piezoelectric element. The acoustic signals therefore receive their own identifier and can therefore be distinguished from one another. For example, the sound transducers differ in terms of their resonant frequency on account of the different control of the second piezoelectric element. In this case, the sound transducers can be operated at different operating frequencies corresponding to their resonant frequencies, with the result that the acoustic signals also have different frequencies. This makes it possible to efficiently use a plurality of structurally identical sound transducers in the same spatial region.

A further aspect specifies a method for operating the arrangement having a plurality of sound transducers. In this case, at least one of the second piezoelectric elements is controlled differently than another of the second piezoelectric elements. At least two sound transducers, in particular structurally identical sound transducers, therefore have different electro-acoustic properties, for example a different resonant frequency, anti-resonant frequency and/or Q factor. This makes it possible, for example, to operate the sound transducers at different operating frequencies corresponding to their respective resonant frequencies. In this case too, all second piezoelectric elements can be controlled differently, with the result that all sound transducers have an individual identifier. The types of control of the second piezoelectric element can be selected as described above, for example.

BRIEF DESCRIPTION OF THE DRAWINGS

The description of the subjects stated here is not restricted to the individual specific embodiments. Rather, the features of the individual embodiments can be combined with one another if technically useful.

The subjects described here are explained in more detail below on the basis of schematic exemplary embodiments.

In the drawings:

FIG. 1 shows an exploded illustration of one embodiment of a sound transducer;

FIG. 2 shows a sectional view of the sound transducer from FIG. 1;

FIG. 3 shows a sectional view of a further embodiment of a sound transducer;

FIG. 4 shows a sectional view of a further embodiment of a sound transducer;

FIG. 5 shows a sectional view of a measurement set-up having two piezoelectric elements for a sound transducer;

FIG. 6 shows a schematic illustration of a flowchart of an operating mode of the sound transducer; and FIG. 7 shows a schematic view of an arrangement of a plurality of sound transducers.

DETAILED DESCRIPTION OF ILLUSTRATIVE EMBODIMENTS

Identical reference signs in the following figures preferably refer to functionally or structurally corresponding parts of the different embodiments.

Figure 1:
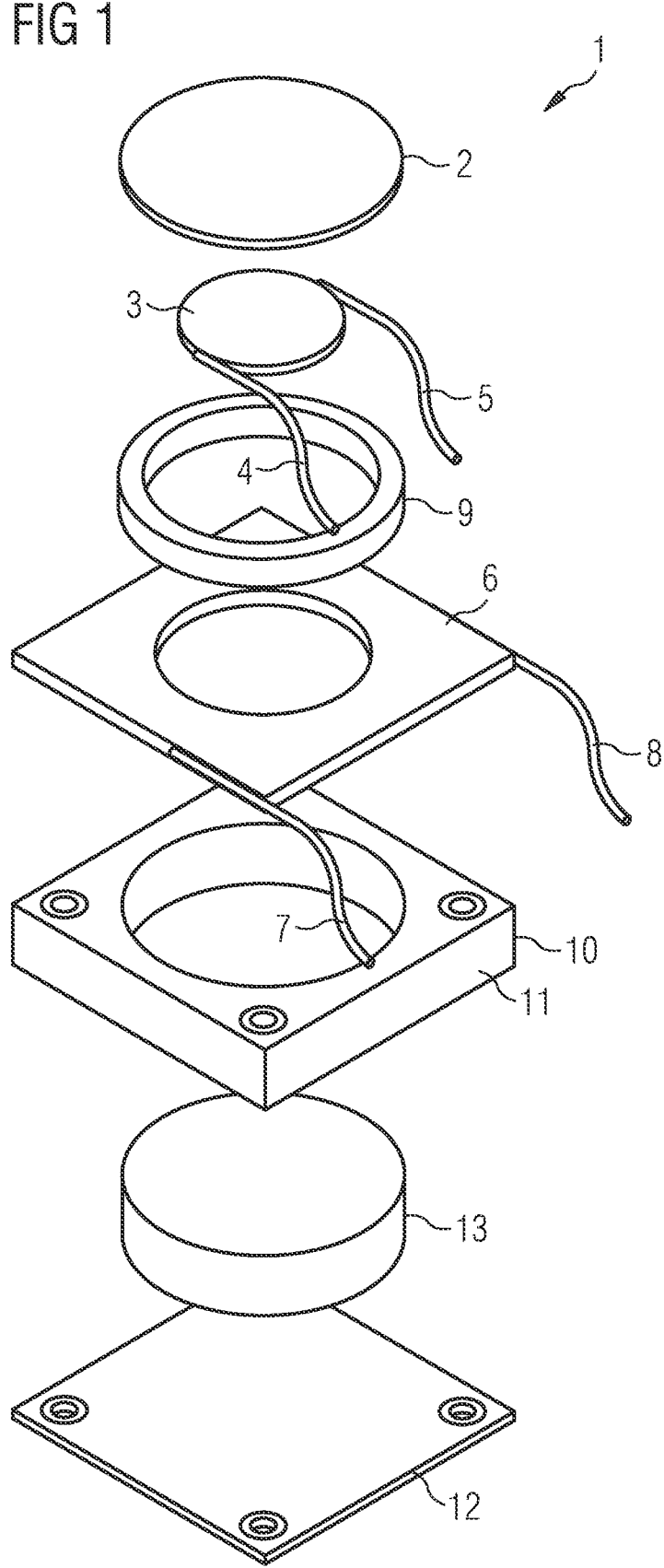

FIG. 1 shows an exploded illustration of one embodiment of a sound transducer 1.

FIG. 2 shows a longitudinal section of this sound transducer 1.

The sound transducer 1 is designed to generate sound waves from an electrical input signal. In particular, these may be sound waves above the human hearing range, in particular in the ultrasonic range. The sound transducer 1 can be used to measure distances, for example for a parking aid in motor vehicles. For this purpose, the sound transducer emits a short acoustic signal that is reflected back at an object, receives the reflected signal and converts it into an electrical signal. The transit time of the acoustic signal and therefore the distance to the reflective object can be determined therefrom.

The sound transducer 1 has a diaphragm 2 for generating sound waves from its vibration. The diaphragm may have Aludur, for example, as the material. The diaphragm 2 is mounted in a vibratable manner. The vibration of the diaphragm 2 can be produced, for example, by a first piezoelectric element 3 which converts an electrical input signal into a mechanical deformation and thereby produces a movement of the diaphragm 2.

The first piezoelectric element 3 has a piezoceramic or is composed of a piezoceramic, for example. The first piezoelectric element 3 may have a disk shape. The first piezoelectric element 3 is, for example, rigidly fastened to the diaphragm 2, for example is adhesively bonded to an inner side of the diaphragm 2.

The first piezoelectric element 3 is controlled via an electrical controller 4, 5, in particular via electrical contact elements, for example in the form of wires. Thin wires which have a low net mass and do not substantially influence or pass on the mechanical vibration of the piezoelectric element 3 are used, for example, to make further contact with connections which are accessible from the outside.

In order to emit an acoustic signal, the first piezoelectric element 3 is excited to vibrate, substantially in the radial direction, by means of an electrical voltage, for example a burst-like AC voltage. This produces a spatial deformation, in particular a curvature of the diaphragm 2, and a vibration in the process. This movement of the diaphragm 2 generates the emitted airborne sound, for example in the ultrasonic frequency range.

The sound transducer 1 has a second piezoelectric element 6 for varying the properties of the sound transducer. The second piezoelectric 6 has a piezoceramic or is composed of a piezoceramic, for example. This may be the same material as in the first piezoelectric element 3.

The second piezoelectric element 6 has a second controller 7, 8, for example via two contact elements in the form of wires which can be used to apply an electrical control voltage during operation. In particular, the resonant frequency, the anti-resonant frequency and/or the Q factor of the sound transducer 1 can be varied during operation by means of the second piezoelectric element 6 by means of the electrical control voltage and/or termination applied to the second piezoelectric element 6.

The second piezoelectric element 6 is in the form of a small plate, for example. The second piezoelectric element may have a central opening in order to ensure an undisrupted vibration of the diaphragm 2.

The second piezoelectric element 6 is coupled to the diaphragm 2 in order to change the properties of the latter. In particular, the second piezoelectric element 6 may be designed to change the mechanical rigidity of the diaphragm 2. For example, the diaphragm 2 is rigidly coupled to the second piezoelectric element 6, for example is directly fastened to the second piezoelectric element 6. For this purpose, the diaphragm 2 can be fastened, in its edge region, to the second piezoelectric element 6 by means of adhesive bonding. The diaphragm 2 may be optionally coupled to the second piezoelectric element 2 via a coupling element 9, for example via the coupling element 9 depicted here in the form of a ring. The movement of the second piezoelectric element 6 is therefore transferred to the diaphragm 2 via the coupling element 9. For example, the diaphragm 2 is fastened to the coupling element 9 and the coupling element 9 is fastened to the second piezoelectric element 6, for example by means of adhesive bonding. The coupling element 9 also forms a supporting surface for the diaphragm 2 here.

It is also possible to form the coupling element 9 in such a manner that the deformation of the second piezoelectric element is mechanically transmitted to the diaphragm 2 in order to achieve greater deformations, for example. The coupling element has a lever function, for example.

The second piezoelectric element 6 can expand or contract in the radial direction by virtue of an electrical voltage being applied to the second piezoelectric element 6. This exerts a tensile force on the diaphragm 2, which tensile force may be stronger or weaker depending on the applied voltage. The level of the tensile force influences the resonant frequency of the diaphragm 2. The resonant frequency of the sound transducer can therefore be changed using the type of electrical control of the second piezoelectric element 6.

The sound transducer 1 also has a carrier 10 which has, for example, a carrier body 11 with a rectangular or round cross section. The carrier body 11 is in the form of a hollow cylinder, for example. The carrier 10 may have a base 12, in particular a base plate, which is connected to the carrier body 11. The base 12 is, for example, rigidly connected to the carrier body 11, for example by means of adhesive bonding.

The second piezoelectric element 6 is fastened to the carrier 10, for example. The fastening is, for example, a soft elastic connection, with the result that the deformation of the second piezoelectric element 6 is not transferred to the carrier 10.

The sound transducer 1 may have an acoustic absorber 13 for forming a desired directional characteristic. The absorber 13 fills cavities in the sound transducer 1, for example. The absorber 13 is in the form of foam, for example, which produces reflections of the sound by virtue of a large number of small cavities and therefore reduces the propagation of the sound through the absorber 13.

In addition, the sound transducer 1 may also have different resonators, with the result that further resonant frequencies arise in addition to the natural frequency of the diaphragm. For example, a cavity resonator may be present as a result of the formation of a suitable cavity under the diaphragm, for example an unfilled cavity in the carrier body 11. In this manner, the sound transducer 1 may have a second resonance which is close to the diaphragm resonance used, for example. A flat profile of the impedance can be achieved over a certain bandwidth between the two resonant frequencies. This can cause useful properties for the application, for example a high sound pressure amplitude combined with a short time constant.

It is also possible to change the vibration mode by means of specific designs of the body 10. For example, a vibration similar to a tuning fork can be achieved with appropriate material distribution over the diaphragm and two thick side surfaces of the body 10.

FIG. 3 shows a longitudinal section of a further embodiment of a sound transducer 1. In contrast to the embodiment in FIG. 1, the first piezoelectric element 3 assumes the function of the diaphragm 2 here.

In this case, the first piezoelectric element 3 is in the edge region on the carrier body 11, with the result that the first piezoelectric element 3 can form a vibration in the horizontal direction and can generate sound waves. The first piezoelectric element 3 is accordingly provided with electrode surfaces and is controlled via a first controller 4, 5.

A coating or diaphragm can be additionally applied to the first piezoelectric element 3, in particular to an outer side of the sound transducer 1. This can be used to protect the piezoelectric element 3 from external influences and/or to protect the environment from the electrode material of the piezoelectric element 3. In this case, the coating or diaphragm should be designed in such a manner that it hinders the vibration of the first piezoelectric element 3 to the slightest possible extent.

The second piezoelectric element 6 is connected to the first piezoelectric element 3, with the result that a deformation of the first piezoelectric element 3 can be produced by electrically controlling the second piezoelectric element 6. This makes it possible to change the resonant frequency of the first piezoelectric element 3 in a specific manner. For example, the second piezoelectric element 6 is fastened to the first piezoelectric element 3 by means of adhesive bonding. It is also possible to fasten the second piezoelectric element 6 to the first piezoelectric element 3 by means of bonding or other connection techniques. The second piezoelectric element 6 may also be connected to the second piezoelectric element 3 by means of joint sintering. An integral body may also be involved here.

In the present embodiment, the second piezoelectric element 6 extends only over a laterally central region of the first piezoelectric element 3 and does not rest on the carrier body 11. In an alternative embodiment, the second piezoelectric element 6 can extend laterally over the entire first piezoelectric element 3 and can rest on the carrier body 11. In this case, the first piezoelectric element 3 and the second piezoelectric element 6 carry out a joint vibration. The second piezoelectric element 6 may also rest on the first piezoelectric element 3. A separate diaphragm may also rest on the carrier body 11 and both piezoelectric elements 3, 6 may be fastened to the diaphragm and may not rest on the latter.

Different types of control are possible. A property of the sound transducer can be controlled in a specific manner depending on the selected type of control.

According to a first variant, an electrical DC voltage is applied to the second piezoelectric element 6 via the second controller 7, 8, with the result that the second piezoelectric element 6 expands or contracts. This exerts a corresponding mechanical stress on the first piezoelectric element 3, thus changing the natural resonant frequency and/or Q factor of this arrangement. For example, measurements of the electrical impedance have shown that the electrical resonant frequency can be shifted slightly and the Q factor can be reduced when a voltage is applied.

According to a second variant, the second piezoelectric element 6 is electrically terminated in a high-resistance manner, while the first piezoelectric element 3 is controlled with an AC voltage. In this case, the vibration is not changed by controlling the second piezoelectric element 6. The voltage generated in the second piezoelectric element 6 can be used for measurement and control purposes here.

According to a third variant, the second piezoelectric element 6 is electrically terminated in a low-resistance manner. In this case, the elastic properties of the second piezoelectric element 6 and therefore also the elastic properties of the first piezoelectric element 3 change. In particular, a considerable shift in the resonant frequency can be achieved by virtue of the low-resistance termination in comparison with the high-resistance termination.

According to a fourth variant, an AC voltage with a shifted phase angle in comparison with the AC voltage applied to the first piezoelectric element 3 is applied to the second piezoelectric element 6 during operation of the sound transducer 1. The phase angle is shifted by 180°, for example. The frequency of the applied AC voltages is the same, for example. In the case of such control, one of the piezoelectric elements 3, 6 is contracted, while the other of the piezoelectric elements 3, 6 expands. For example, the piezoelectric elements 3, 6 are electrically connected in series.

In comparison with the second variant (high-resistance termination), such control results in a higher amplitude or a lower control voltage amplitude suffices to produce a particular deflection of the diaphragm 2. It has been found that the electrical load capacitance of the two piezoelectric elements 3, 6 is reduced, for example halved, in comparison with the capacitance of an individual piezoelectric element. In addition, the resonant frequency can be shifted to lower values here.

According to a fifth variant, the second piezoelectric element 6 is operated with an AC voltage of the same phase angle as the first piezoelectric element 3 during operation of the sound transducer 1. For example, the frequency is also the same, with the result that the connection corresponds to an electrical parallel circuit. In this manner, the point of resonance can be reduced or caused to disappear.

FIG. 4 shows a longitudinal section of a further embodiment of a sound transducer 1.

The diaphragm 2 is formed in one part with a carrier 10 here. The carrier body 11 of the carrier 10 is in the form of a hollow body, in particular a cylindrical hollow body. The diaphragm 2 forms a cover for the carrier body 11. The carrier body 11 and the diaphragm 2 have Aludur as the material or are composed of Aludur, for example. The carrier body 11 is produced, for example, together with the diaphragm 2 by means of extrusion or milling. The carrier 10 may have a base 12. An acoustic absorber 13 may be present in the carrier 10.

The diaphragm 2 is thinner than the carrier body 11, for example, with the result that the ability of the diaphragm 2 to vibrate is ensured.

A first piezoelectric element 3 is fastened to an underside of the diaphragm 2 and a second piezoelectric element 6 is fastened underneath. In this case, the first piezoelectric element 3 is used to excite or receive a vibration of the diaphragm 2, in particular. The second piezoelectric element 6 is used to set electro-acoustic properties of the sound transducer. The first piezoelectric element 3 is controlled via a first controller 4, 5 and the second piezoelectric element 6 is controlled via a second controller 7, 8, in particular has a voltage applied to it.

FIG. 5 shows a measurement set-up for measuring the electrical properties of an arrangement, in which a second piezoelectric element 6 is fastened to a first piezoelectric element 3 by means of an adhesive 18. Both piezoelectric elements 3, 6 have PZT as the material. The diameter of the arrangement of the two piezoelectric elements 3, 6 is 7.2 mm and the thickness is 0.4 mm. In the present case, the piezoelectric elements 3, 6 have the same lateral extent.

The arrangement which is present in the measurement set-up can be used, with the shown structure and the dimensions, in a sound transducer in a motor vehicle. For example, a corresponding set-up may be present in a sound transducer from FIG. 3 or FIG. 4.

The set-up is suitable, for example, for an embodiment in which an additional diaphragm for generating and/or receiving an acoustic signal is present. In this case, the diameter of the arrangement is smaller than the diaphragm, for example, with the result that only the diaphragm is mounted, in its edge region, on a carrier body and the arrangement is fastened only to the diaphragm.

Furthermore, the set-up can also be used in an embodiment in which at least one of the piezoelectric elements forms a diaphragm for generating and/or receiving an acoustic signal. In this case, the second piezoelectric element 6 has a smaller diameter than the first piezoelectric element 3, for example, with the result that the first piezoelectric element 3 is mounted in a vibratable manner in the edge region on a carrier body and the second piezoelectric element 6 is fastened only to the first piezoelectric element 3, but is not mounted on the carrier body. Both piezoelectric elements 3, 6 may also be mounted in a vibratable manner on a carrier body. For example, both piezoelectric elements 3, 6 have the same diameter in this case.

The first piezoelectric element 3 has two external electrodes 14, 15, to which a voltage is applied via the first controller 4, 5. In addition, the electrical impedance and therefore the electrical resonance and anti-resonance are measured via the first controller 4, 5. The second piezoelectric element 6 likewise has two external electrodes 16, 17, with which electrical contact is made via the second controller 7, 8. Contact can also be made with the external electrodes 15, 16 in the center, for example they can be grounded, via a common contact element.

It has been found in the electrical measurements that the resonant frequency at 50 kHz can be reduced by a few kHz if the termination of the second piezoelectric element 6 is changed from high-resistance to low-resistance in a manner corresponding to the position of the switch 19 from "open" to "closed", in which case the electrical Q factor remains at the same value.

FIG. 6 shows a flowchart of possible operating modes of the sound transducer from the figures described above. Control during a transmitting and/or receiving mode or a mode for calibrating the sound transducer may be involved here.

In a first step A, the sound transducer has a resonant frequency $f_R$. For example, the sound transducer is designed for operation at an operating frequency $f_B$. The operating frequency $f_B$ can correspond to the resonant frequency $f_R$ or may differ from the latter. The second piezoelectric element is terminated in a high-resistance manner, for example, at the present resonant frequency $f_R$. The second piezoelectric element 6 can also be controlled in a different manner. In the transmitting mode, the first piezoelectric element 3 can be operated at an operating frequency $f_B$ in step B. During calibration, the resonant frequency $f_R$ is measured, for example, and a deviation from a desired resonant frequency is determined.

In a subsequent step B, the control S of the second piezoelectric element 6 is changed, for example said element is terminated in a low-resistance manner or is controlled in another manner. The resonant frequency $f_R$ of the sound transducer is shifted to a value $f^{R'}$, by controlling the second piezoelectric element. For example, the resonant frequency is shifted toward the operating frequency $f_B$. In addition or instead, the anti-resonant frequency $f_{AR}$ may also be shifted to a value $f_{AR'}$. For example, the anti-resonant frequency is shifted toward the operating frequency $f_B$. The sound transducer 1 is operated in the transmitting mode, for example at an operating frequency $f_B$, in step B or is ready to receive an acoustic signal in the receiving mode.

Different scenarios are described in detail below.

For example, the resonant frequency and/or Q factor of a sound transducer may change, for example on account of environmental conditions such as a hot or cold temperature. In this case, the resonant frequency and/or Q factor no longer match(es) the preset operating frequency $f_B$ (step A). The resonant frequency and/or Q factor can be brought to the original value again by suitably controlling the second piezoelectric element (step B). A change in the resonant frequency and/or Q factor can therefore be compensated for. This makes it possible to keep the sensitivity of the sound transducer when receiving an echo and the measurable distance range at a desired value. The system performance can therefore be reliably held at an optimum value and accordingly specified.

Additionally or alternatively, in the case of such a set-up, it is possible to optimize the efficiency of the sound transducer 1 both when emitting sound and when receiving sound. The most favorable operating points are at the resonant frequency and the anti-resonant frequency here and are therefore at slightly different frequencies; for example, the frequencies may differ by 1.5 kHz in the operating range at 60 kHz. After a signal has been emitted (step A), the anti-resonant frequency can be shifted toward the resonant frequency by suitably controlling S the second piezoelectric element 6 (step B), with the result that the efficiency is optimized both when emitting and when receiving the signal. Alternatively, the resonant frequency can also be shifted to the anti-resonant frequency.

Additionally or alternatively, a shift in the resonant frequency and/or the anti-resonant frequency of the sound transducer 1 also makes it possible to shorten the time in which the sound transducer 1 is not ready for reception between the emission of a signal and the reception of the echo. The waiting time between emission and reception of the echo is usually based on the sound transducer 1 having a high Q factor in the operating frequency range, with the result that a few vibration cycles elapse after switching on the electrical transmission signal before the full acoustic amplitude is reached. If the electrical transmission signal is switched off, it in turn takes some time for the vibration of the diaphragm to decay and for the sound transducer 1 to be ready to receive the echo. However, a high Q factor is advantageous and desired for electro-acoustic conversion.

In the sound transducer 1 described, the time between emission and readiness to receive can be reduced by controlling the second piezoelectric element 6, after a signal burst has been emitted (step A), in such a manner that the resonant frequency is shifted. The frequency of the decaying vibration of the transmitted signal is therefore shifted, with the result that this frequency differs from the frequency of the incoming echo. For example, the resonant frequency and the anti-resonant frequency are shifted toward a lower frequency in order to achieve the situation, according to the type of control described above, in which the anti-resonant frequency is at the resonant frequency. The additional use of filters makes it possible to selectively transmit the transmission frequency, for example, with the result that the measurement is not disrupted by the decaying signal and the waiting time to reception is shortened. This also makes it possible to reduce a minimum measurable distance. It also makes it possible to shorten the time to readiness to receive without reducing the Q factor of the sound transducer.

Additionally or alternatively, in such a set-up, it is possible to compensate for manufacturing-related variations in the resonant frequency by suitably controlling the second piezoelectric element 6. In this case, the sound transducer 1 is produced in step A, for example, and a type of control of the second piezoelectric element 6, which shifts the resonant frequency toward a desired target value, is determined. During operation (step B), the sound transducer 1 is then operated with the selected type of control of the second piezoelectric element 6. This dispenses with expensive sorting out of sound transducers which, owing to manufacture, do not have the desired resonant frequency.

The resonant frequency, anti-resonant frequency and/or Q factor of the sound transducer can therefore be controlled or quickly changed over by means of the type of termination, for example high-resistance or low-resistance.

In the case of an arrangement of a plurality of spatially adjacent sound transducers of the same design for example, this makes it possible to provide the output signal with an identifier, with the result that the signals can be distinguished. For example, in the case of an arrangement of a plurality of spatially adjacent sound transducers, one of the sound transducers can be controlled according to the second variant (high-resistance termination) and one of the sound transducers can be controlled according to the third variant (low-resistance termination). The control operations can also be varied between all variants or different types of control can be used for the different sound transducers in the case of a plurality of sound transducers.

Figure 7:
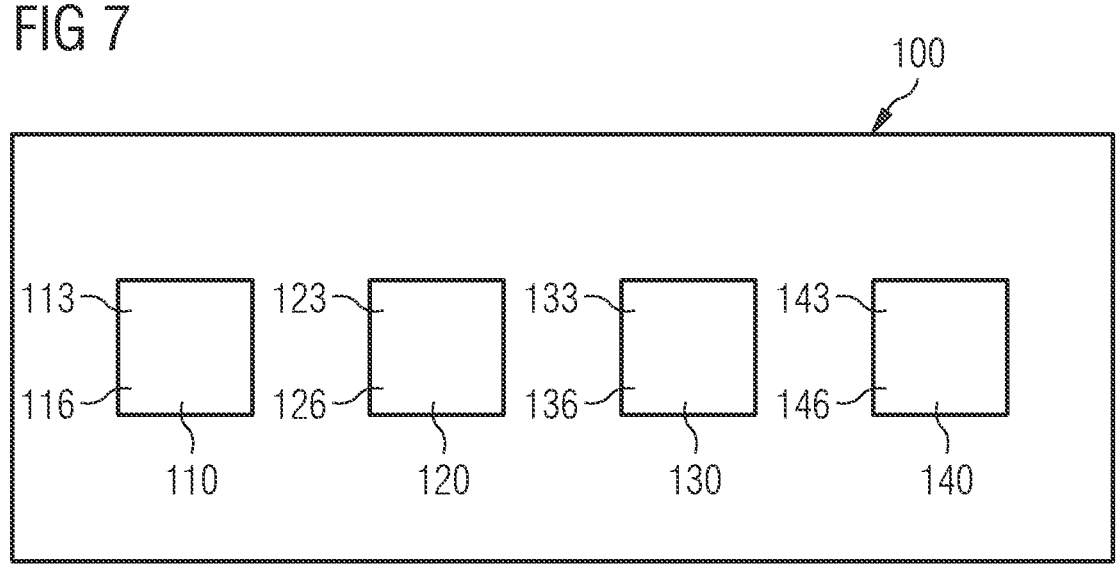

FIG. 7 shows a schematic view of an arrangement 100 having a plurality of sound transducers 101-104. The arrangement 100 may also have more or fewer than the four sound transducers 101-104 shown. The sound transducers 101-104 are operated in the same spatial region.

For example, a parking aid in an automobile is involved. The sound transducers 101-104 are arranged at different positions on a rear fender, for example. The sound transducers 101-104 may each have the set-up described in FIGS. 1 to 4, for example. In particular, each of the sound transducers 101-104 has a first piezoelectric element 113-143 and a second piezoelectric element 116-146. In particular, the sound transducers 101-104 may have the same structure.

On account of the control of the second piezoelectric element 116-146, the sound transducers 101-104 can be operated at the same frequency at the same time without mutual interference occurring. In particular, the respective first piezoelectric element 113-143 in all sound transducers 101-104 can be controlled at the same frequency. The respective second piezoelectric element 116-146 is controlled differently, for example according to the various control variants described above.

In this manner, the sound wave emitted by a sound transducer is provided with an identifier depending on the operating mode of the respective second piezoelectric element 116-146. In particular, the operating frequency of the respective first piezoelectric element 113-143, which is at the resonant frequency of the sound transducer for example, is changed. This makes it possible to operate the identically constructed sound transducers 101-104 at different operating frequencies, which correspond to the respective resonant frequency for example, and therefore to keep the signals distinguishable. It is therefore not necessary to use different construction types of sound transducers 101-104 in the arrangement 100.

Alternatively, the sound transducers 101-104 can be operated at the same operating frequency, in which case emitted and received signals can then be distinguished on the basis of their Q factor, amplitude or other properties. The controllability of the properties of the sound transducer not only allows the first piezoelectric element to be controlled at constant operating frequencies during a signal burst, but also allows the operating frequency to be changed during a signal burst. For example, in a sound transducer, the frequency can be changed from high to low, from low to high or from high to low and to high again. Accordingly, the second piezoelectric element can be controlled in a variable manner. During reception, the signal processing then allows the individual signals to be evaluated separately.

For example, such a set-up makes it possible to constantly keep a repetition rate high, that is to say the rate of emitted signal bursts from an individual sound transducer, with an increasing number of sound transducers, at least until the number of different identifiers from the control of the second piezoelectric element has been exhausted. Such arrangements of sound transducers of an identical construction type must usually be operated using time-division multiplexing, in which case only the first sound transducer emits a signal, the process waits for the echo transit time for the maximum measurement distance and the second sound transducer then emits a signal etc. In this case, the possible sampling rate becomes lower with the number of sound transducers.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A sound transducer comprising:
   a carrier body;
   a first piezoelectric element comprising:
      first external electrodes configured to generate an acoustic signal from an electrical signal or vice versa, and
      at least one second external electrode, wherein the second external electrode is separately controllable from the first external electrodes in order to set electro-acoustic properties of the sound transducer;
   a diaphragm configured to generate and/or receive the acoustic signal,
   wherein the diaphragm is mounted in a vibratable manner on the carrier body,
   wherein the first piezoelectric element is configured to convert the electrical signal into a deformation of the diaphragm or vice versa; and
   a second piezoelectric element, on which the second external electrode is arranged,
   wherein the second piezoelectric element forms a stacked arrangement with the first piezoelectric element, and
   wherein the stacked arrangement is fixed to one side of the diaphragm.

2. The sound transducer according to claim 1, wherein the first and second piezoelectric elements comprise a piezoceramic.

3. The sound transducer according to claim 1, wherein the second piezoelectric element is fixed to the carrier body, integrated in the carrier body or forms the carrier body.

4. The sound transducer according to claim 1, wherein the second piezoelectric element is connected only to a supporting region of the diaphragm, the supporting region being located at an edge of the diaphragm.

5. The sound transducer according to claim 1, wherein the second piezoelectric element is designed to radially expand or contract when a voltage is applied, and wherein a deformation is transferred to the diaphragm such that a rigidity of the diaphragm changes.

6. The sound transducer according to claim 1, wherein the first piezoelectric element is fastened to the diaphragm.

7. The sound transducer according to claim 1, wherein the second piezoelectric element is coupled to the diaphragm via a coupling element.

8. The sound transducer according to claim 1, wherein the diaphragm is formed in one part with the carrier body.

9. A method for operating a sound transducer, wherein the sound transducer comprises a first piezoelectric element having first external electrodes configured to generate an acoustic signal from an electrical signal or vice versa, and at least one second external electrode, wherein the second external electrode is separately controllable from the first external electrodes in order to set electro-acoustic properties of the sound transducer, the method comprising:
   controlling the second external electrode in such a manner that the electro-acoustic properties of the sound transducer are set in a specific manner, wherein the controlling the second external electrode comprises changing an anti-resonant frequency of the sound transducer after emitting the acoustic signal.

10. The method according to claim 9, wherein controlling the second external electrode comprises compensating an environment-related or age-related change in a resonant frequency and/or a Q factor of the sound transducer.

11. The method according to claim 9, further comprising simultaneously controlling the first external electrodes thereby generating the acoustic signal at a resonant frequency.

12. The method according to claim 9, wherein controlling the second external electrode comprises shifting a resonant frequency of the sound transducer to a desired value.

13. The method according to claim 9, wherein controlling the second external electrode comprises a low-resistance termination, a high-resistance termination, applying an electrical DC voltage or applying an electrical AC voltage.

14. An arrangement comprising:
   a plurality of sound transducers according to claim 1,
   wherein the second external electrodes of the sound transducers are differently controllable from one another.

15. The arrangement according to claim 14, wherein the arrangement is a parking aid for a motor vehicle.

16. A method for operating the arrangement according to claim 14, the method comprising:
   differently controlling at least one of the second external electrodes than another of the second external electrodes.

17. The method according to claim 16, wherein differently controlling the at least one of the second external electrodes than another of the second external electrodes comprises ensuring that the acoustic signals emitted by the sound transducers are distinguishable.

18. A sound transducer comprising:
   a carrier body;
   a first piezoelectric element comprising:
      first external electrodes configured to generate an acoustic signal from an electrical signal or vice versa, and
      at least one second external electrode, wherein the second external electrode is separately controllable from the first external electrodes in order to set electro-acoustic properties of the sound transducer;
   a diaphragm configured to generate and/or receive the acoustic signal,
   wherein the diaphragm is mounted in a vibratable manner on the carrier body, wherein the first piezoelectric element is designed to convert the electrical signal into a deformation of the diaphragm or vice versa; and a second piezoelectric element, on which the second external electrode is arranged, wherein the second piezoelectric element is fixed to the carrier body, integrated in the carrier body or forms the carrier body.

19. A method for operating an arrangement of a plurality of sound transducers, wherein each of the sound transducers comprises a first piezoelectric element having first external electrodes for generating an acoustic signal from an electrical signal or vice versa and a second piezoelectric element on which a second external electrode is arranged, the method comprising:

controlling the second external electrodes in such a manner that electro-acoustic properties of each respective sound transducer are set in a specific manner, in which at least one of the second external electrodes is controlled differently than another one of the second external electrodes and in which the different controls ensure that the acoustic signals emitted by the sound transducers at the same time are distinguishable.

20. The sound transducer according to claim 1, wherein the first piezoelectric element and the second piezoelectric element are electrically connected in series, or wherein the connection corresponds to an electrical parallel circuit.

21. A method for operating the sound transducer of claim 1, the method comprising:

controlling the second piezoelectric element to optimize the sound transducer for operation at long distances or at short distances.

22. A method for operating the sound transducer of claim 1, the method comprising:

controlling the second piezoelectric element to radially expand or contract when a voltage is applied, wherein the deformation is transferred to the diaphragm such that a rigidity of the diaphragm and therefore a resonant frequency, anti-resonant frequency and/or Q factor of the diaphragm changes.

* * * * *